US008424952B2

(12) United States Patent
Schmitt

(10) Patent No.: US 8,424,952 B2
(45) Date of Patent: Apr. 23, 2013

(54) APPARATUS FOR LOCKING AND UNLOCKING A FOLDING-TOP COMPARTMENT LID

(75) Inventor: Hans-Jürgen Schmitt, Muehlacker (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 121 days.

(21) Appl. No.: 12/906,296

(22) Filed: Oct. 18, 2010

(65) Prior Publication Data

US 2011/0095560 A1 Apr. 28, 2011

(30) Foreign Application Priority Data

Oct. 23, 2009 (DE) .......................... 10 2009 050 497

(51) Int. Cl.
B60J 7/20 (2006.01)
(52) U.S. Cl.
USPC ............. 296/136.05; 296/107.08; 296/136.06
(58) Field of Classification Search .................. 296/224, 296/107.08, 136.06, 136.05, 121, 128
See application file for complete search history.

(56) References Cited

U.S. PATENT DOCUMENTS

| 5,052,740 | A | 10/1991 | Bauer et al. |
| 6,168,224 | B1 | 1/2001 | Henn et al. |
| 7,497,499 | B2 | 3/2009 | Halbweiss et al. |
| 7,681,938 | B2 | 3/2010 | Selle et al. |
| 8,132,843 | B2 * | 3/2012 | Schmitt .................... 296/136.05 |
| 2008/0218828 | A1 | 9/2008 | Schumacher |
| 2008/0277975 | A1 | 11/2008 | Biecker et al. |

FOREIGN PATENT DOCUMENTS

| DE | 38 30 393 C1 | 8/1989 |
| DE | 41 13 616 C1 | 7/1992 |
| DE | 299 16 003 U1 | 3/2001 |
| DE | 10107079 A1 * | 8/2002 |
| DE | 103 39 816 A1 | 4/2005 |
| DE | 10 2005 052 063 A1 | 5/2007 |
| DE | 10 2004 042 261 B4 | 3/2009 |
| DE | 10 2007 060 486 A1 | 6/2009 |
| DE | 10 2008 011 587 A1 | 9/2009 |
| DE | 10 2005 043 511 B4 | 2/2010 |
| EP | 0 846 584 B1 | 9/2001 |

OTHER PUBLICATIONS

German Patent and Trademark Office Search Report, Dated Sep. 22, 2010.

* cited by examiner

Primary Examiner — Glenn Dayoan
Assistant Examiner — Melissa A Black
(74) Attorney, Agent, or Firm — Gerald E. Hespos; Michael J. Porco; Matthew T. Hespos

(57) ABSTRACT

A folding-top compartment lid is held on a mounting support which can be moved into an open and a closed position by opening levers. To lock the folding-top compartment lid, locking hooks are provided, and these can be activated along with the opening levers in accordance with the control of the latter.

15 Claims, 10 Drawing Sheets

APPARATUS FOR LOCKING AND UNLOCKING A FOLDING-TOP COMPARTMENT LID

CROSS-REFERENCE TO RELATED APPLICATION

This application claims the priority, under 35 U.S.C. §119, of German application DE 10 2009 050 497.4, filed Oct. 23, 2009; the prior application is herewith incorporated by reference in its entirety.

BACKGROUND OF THE INVENTION

Field of the Invention

The invention relates to an apparatus for locking and unlocking a folding-top compartment lid for a rear folding-top compartment for holding a lowered folding top of a convertible. The folding-top compartment lid can be moved into an open position and a closed position by four-bar hinges on each side of the folding-top compartment, formed by front and rear opening levers, using an activatable actuating device with a lever segment. The opening levers are arranged in an articulated manner between a bearing bracket on the body and a mounting support for the folding-top compartment lid. The unlocking and locking device is provided between the bearing bracket and the folding-top compartment lid.

European patent EP 0 846 584 B1, corresponding to U.S. Pat. No. 6,168,224, discloses a folding-top compartment lid for a motor vehicle, especially a convertible, which by use of opening levers, which form what is referred to as a four-bar hinge and which can be pivoted into an open and a closed position. An integrated locking device interacting with the opening levers is used to secure the closed position of the folding-top compartment lid by a locking hook.

SUMMARY OF THE INVENTION

It is accordingly an object of the invention to provide an apparatus for locking and unlocking a folding-top compartment lid which overcomes the above-mentioned disadvantages of the prior art devices of this general type, which can be moved into an open and a closed position and can be fixed and released again in a simple manner by an unlocking and locking device.

With the foregoing and other objects in view there is provided, in accordance with the invention an apparatus for locking and unlocking a folding-top compartment lid for a rear folding-top compartment for holding a lowered folding top of a convertible. The folding-top compartment lid can be moved into an open position and a closed position by four-bar hinges on each side of the rear folding-top compartment, formed by front and rear opening levers. The front and rear opening levers are disposed in an articulated manner between a bearing bracket on the body and a mounting support for the folding-top compartment lid. The apparatus contains an activatable actuating device having a lever segment with an integrated actuating element, and a locking and unlocking device disposed between the bearing bracket and the folding-top compartment lid. The locking and unlocking device has a coupler rod and first and second locking hooks. The first locking hook is associated with the mounting support and the second locking hook is associated with the front opening lever. The first and second locking hooks are connected to one another by the coupler rod in a manner which allows synchronous movement. The first locking hook has a downwardly disposed control cam which, in a locking position, is in engagement with the integrated actuating element on the lever segment of the activatable actuating device and, in an unlocking position, is pivoted free and disposed out of engagement with the integrated actuating element.

The principal advantages achieved by the invention are that one actuating element is used to activate locking hooks of a locking device while simultaneously being used to move the folding-top compartment lid into an open and a closed position. For this purpose, the locking device has respective locking hooks, one associated with the mounting support and one associated with a front opening lever, which hooks are connected to one another by a coupler rod in a manner which allows synchronous movement, with one locking hook, that associated with the mounting support, having a control cam which, in the locking position, is in engagement with an integrated actuating element on the lever segment of the actuating device and, in the unlocking position, is pivoted free and arranged out of engagement with the actuating element. By use of the lever segment, which can be activated for pivoting by way of an actuating cylinder, preferably by way of a hydraulic cylinder, the locking hook is pivoted synchronously in a simple manner by way of the control cam, more specifically into a locking and an unlocking position.

In particular, according to the invention, in the locking position the locking hook is arranged with a downwardly arranged control cam in a claw-type receptacle of the actuating element in the lever segment, in a manner firmly grasped on each side by two nose-shaped features, and, with its remote hook end, receives a locking pin on the mounting support in a latching manner in a longitudinal slot. In the locking position, the locking hook is thus fixed by the two nose-shaped features, which grasp the control cam from each side. In order to achieve this, in the locking position one nose-shaped feature of the actuating element, that situated at the front—as seen in the direction of travel—is raised, more specifically as far as a recess in a front guide surface in the control cam, and the other nose-shaped feature, that situated at the rear—as seen in relation to the direction of travel—is arranged in contact with a rear sliding surface of the control cam.

As the unlocking position is adopted from the locking position, the nose-shaped feature situated at the rear has a nose tip which points toward the rear sliding surface of the control cam and, when the lever segment is pivoted, is configured to act upon the locking hook so as to turn it in order to prepare the unlocking process. Furthermore, in the unlocking position the control cam is supported by its rear sliding surface on an arcuate surface of the lever segment adjoining the nose-shaped feature, and is arranged in a manner pivoted so as to be completely free of the claw-shaped receptacle of the actuating element of the lever segment. The support of the control cam on the arcuate surface of the lever segment on the one hand ensures that the locking hook is pivoted completely free and, on the other hand, ensures that the locking hooks are thus held secure. Further rotation is prevented by a stop on the bearing bracket. If appropriate, a leg spring may be used to support this function.

To return the locking hook from the pivoted-free unlocking position into the pivoted-in locking position, the front nose-shaped feature of the lever segment fits over the guide surface of the control cam of the locking hook by the nose tip at the end in such a way that the locking hook is acted upon so as to turn it back. In a simple way, the invention thus makes it possible to ensure that, during a closing operation of the folding-top compartment lid and an associated pivoting motion of the lever segment by the actuating cylinder, the front nose tip of the control cam of the locking hook is acted upon in such a way that the hook can be moved back into a locking position.

To achieve a wider basis of support for the front opening lever and the lever segment on the bearing bracket, the invention furthermore makes provision for the front opening lever and the lever segment to be held on a common bearing pin with an optimum wide basis of support, the front opening lever being arranged on one side of the bearing bracket and the lever segment being arranged on the opposite side of the bearing bracket. By this embodiment, stable articulation of the lever segment and of the front opening lever is achieved.

Specifically, the bearing pin is securely connected to the opening lever and is rotatably mounted in the bearing bracket.

To enable the front opening lever to be securely fixed in a transverse direction (Y direction) in a closed position, a stop, preferably an angular stop, is provided on the front opening lever, which stop can be supported, preferably by the projecting leg thereof, on the top of the bearing bracket.

Instead of a control cam on the locking hook, it is also possible, according to another advantageous embodiment of the invention, for arcuate toothing to be provided both on the locking hook and on the lever segment. The arcuate toothing is embodied as a "toothed section", which is in engagement with a corresponding further toothed section on the lever segment during the locking position. In the unlocking position, the two toothed sections are out of engagement with one another and the toothed section of the locking hook is supported and held secure on an arcuate path of the lever segment.

For the purpose of adopting the locking position, the lever segment is in engagement with the toothed section of the locking hook and is arranged so as to pivot the latter when the lever segment is in a pivoted-back position.

By virtue of this embodiment, force is transmitted between the locking hook and the driving lever segment by the toothed sections. According to the invention, this advantageously ensures that, once the locking hook has unlocked the folding-top compartment lid, the arcuate path on the lever segment brings about unintended closure of the locking hook. An end stop for the locking hook is provided through contact with the arcuate path or simply by a projection, for example.

The advantages of such an embodiment with interengaging toothed sections consist essentially in a uniform action of force on the locking hook during locking and unlocking. It is furthermore advantageous that the locking hook and the lever segment can be arranged in one plane. Moreover, both components can preferably be produced in a simple manner by fine blanking.

Other features which are considered as characteristic for the invention are set forth in the appended claims.

Although the invention is illustrated and described herein as embodied in an apparatus for locking and unlocking a folding-top compartment lid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
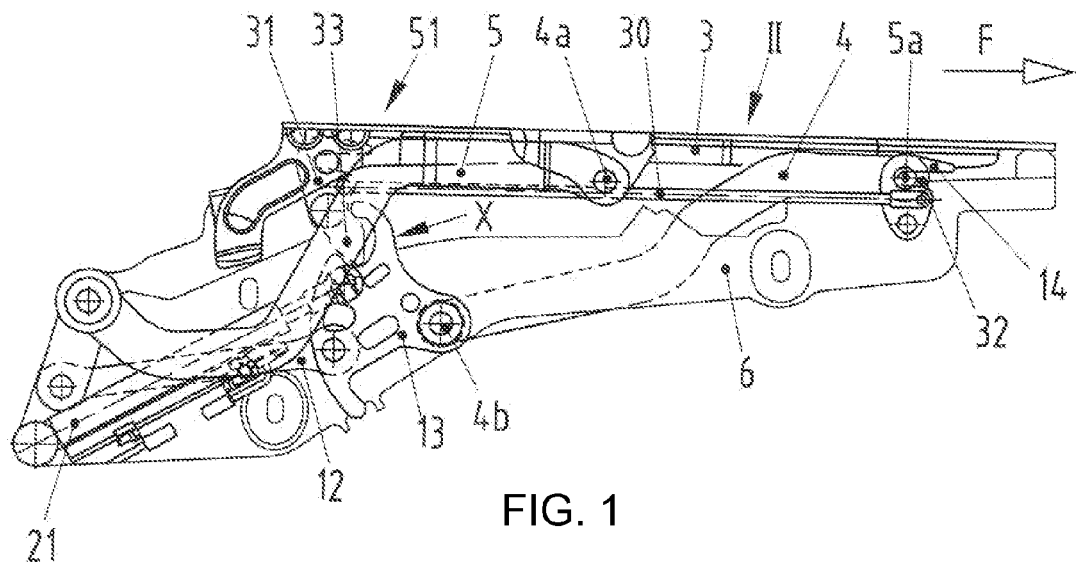
FIG. 1 is a diagrammatic, side view of an articulation for a folding-top compartment lid in a closed and locked position of a mounting support for the folding-top compartment lid according to the invention.
Figure 7:
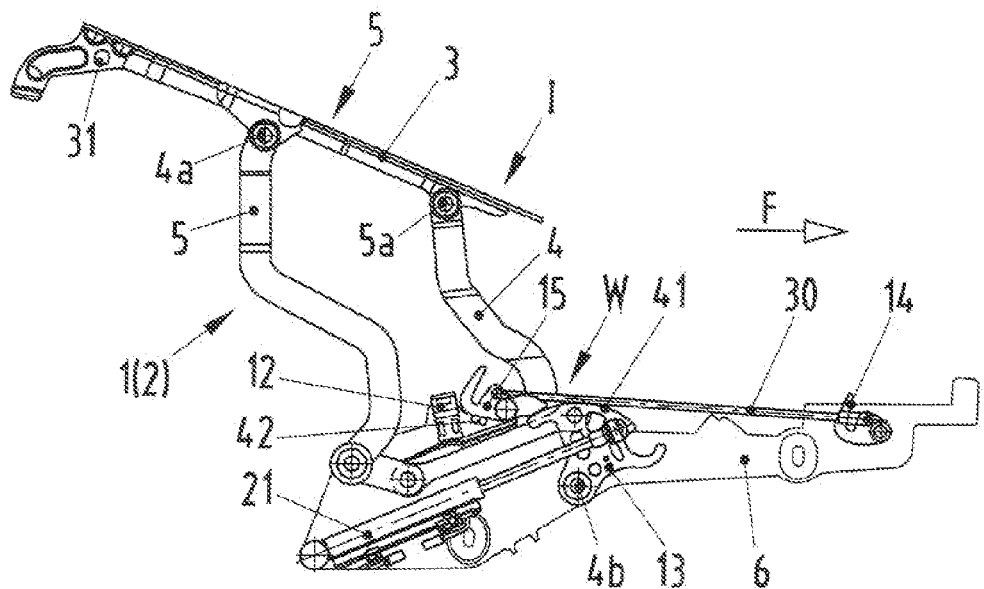
FIG. 7 is a side view of the articulation after the unlocking process, with the folding-top compartment lid opened.

Referring now to the figures of the drawing in detail and first, particularly, to FIGS. 1 and 7 thereof, there is shown a non-illustrated folding-top compartment lid for a convertible that can be moved, by way of two hinge units 1, 2 spaced apart in a transverse direction, into an open position, which corresponds to an unlocking position I, and into a closed position, which corresponds to a locking position II. In each of the drawings, just one hinge unit is shown in a side view. Each hinge unit 1, 2 contains a mounting support 3, which is connected to the folding-top compartment lid and to which a front and a rear opening lever 4, 5—as seen in relation to the direction F of travel—are articulated at support points 4a and 5a. The opening levers 4 and 5 are furthermore held pivotably at support points on a fixed bearing bracket 6, which is connected to the vehicle body at a number of fastening points.

Figure 2:
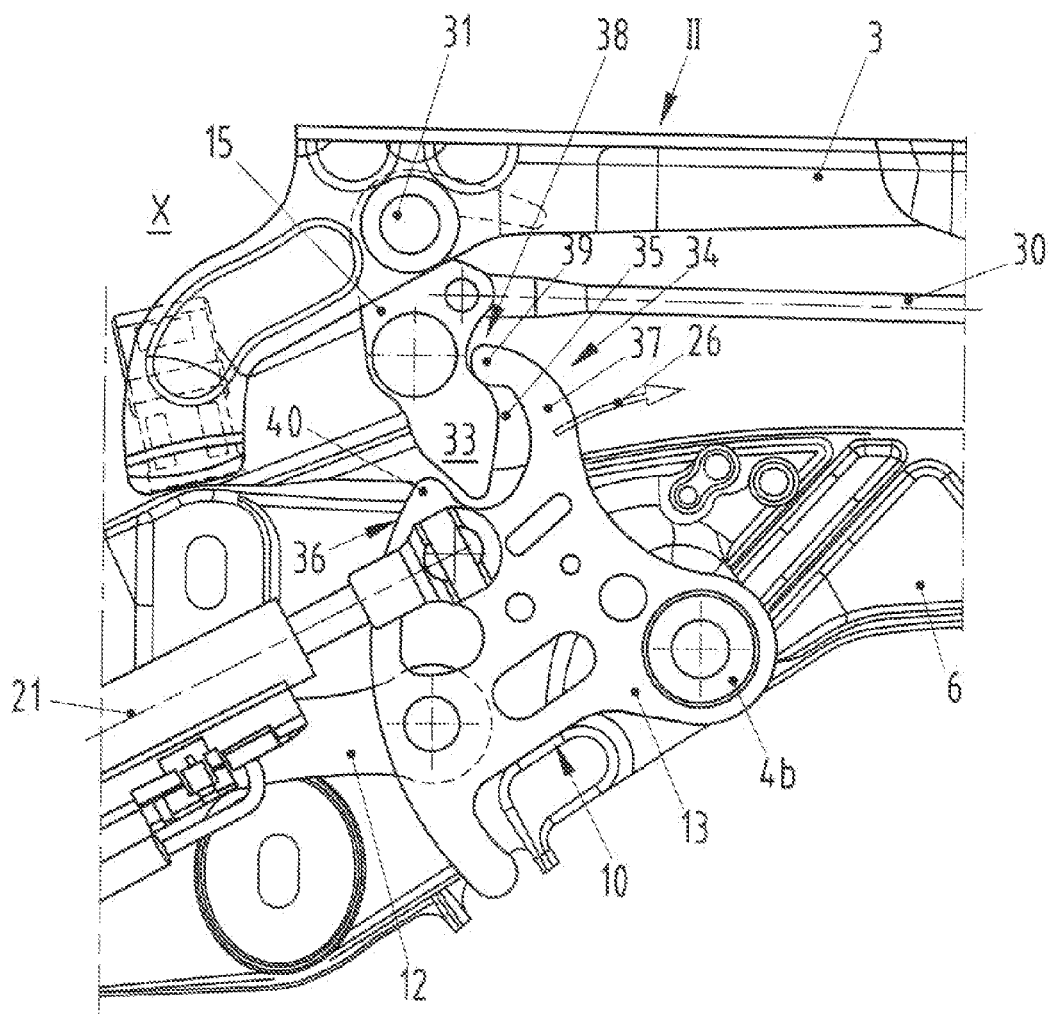
FIG. 2 is an enlarged representation of area X shown in FIG. 1, showing a locking hook with an actuating element on a lever segment of an actuating assembly for the folding-top compartment lid.
Figure 3:
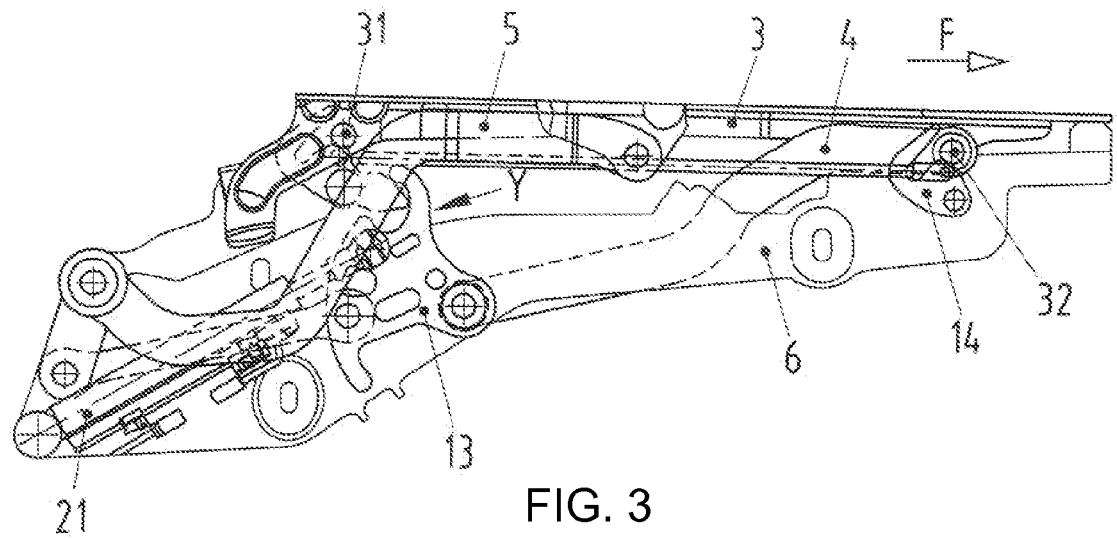
FIG. 3 is a side view of the articulation with the folding-top compartment lid closed during an unlocking process, with the locking hook pivoted so as to be partially free.
Figure 4:
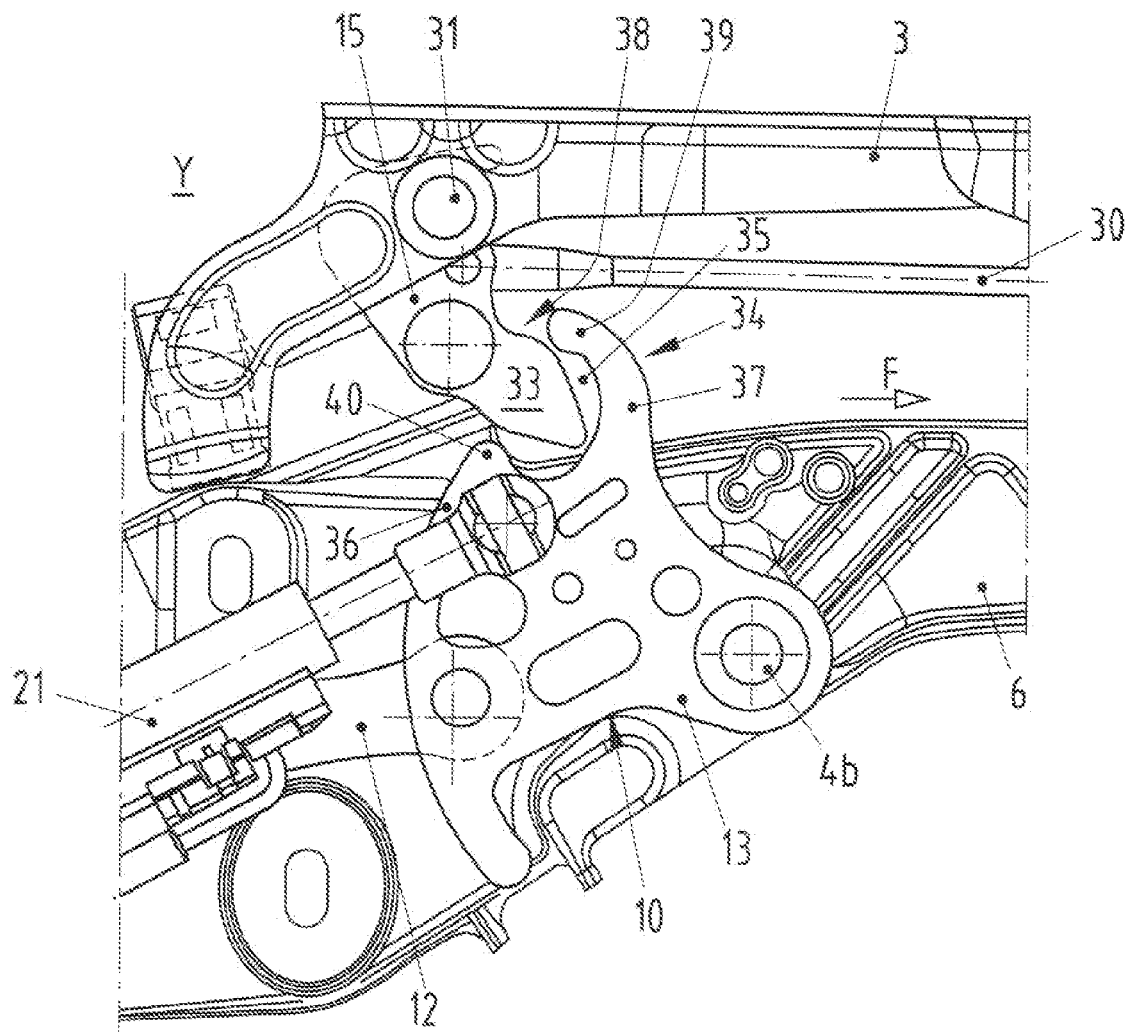
FIG. 4 is an enlarged representation of area Y shown in FIG. 3 viewed in the direction of the locking hook with the actuating element.
Figure 5:
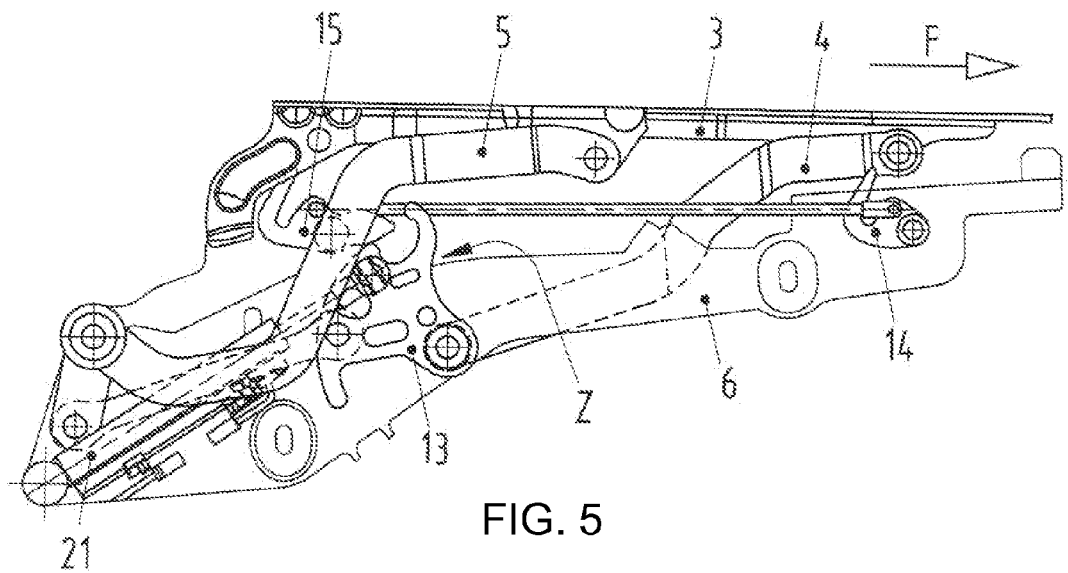
FIG. 5 is a side view of the articulation during the unlocking process with the locking hook pivoted so as to be completely free and the folding-top compartment lid closed.
Figure 6:
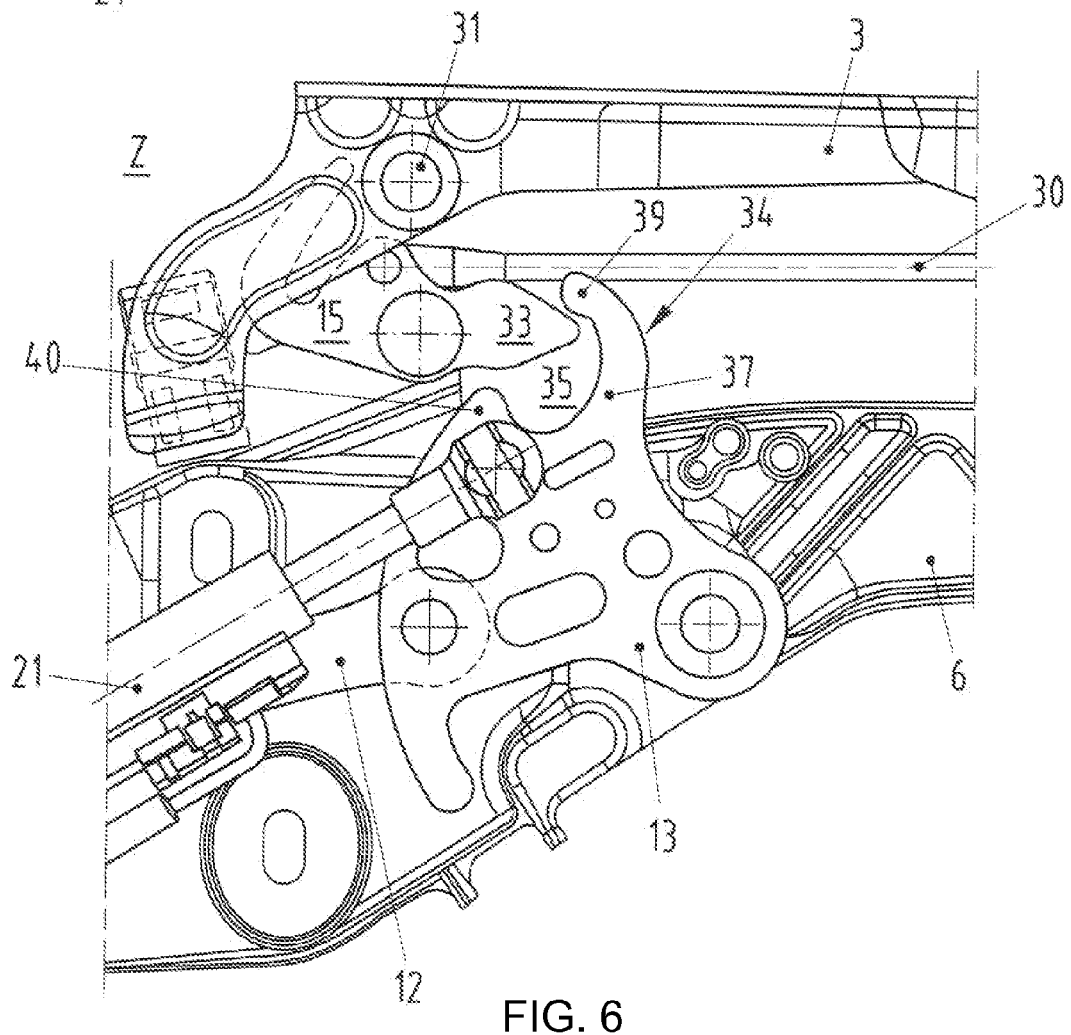
FIG. 6 is an enlarged representation of area Z shown in FIG. 5 viewed in the direction of the locking hook with the actuating element.

Together with the mounting support 3 and the bearing bracket 6, the two opening levers 4, 5 each form what is referred to as a four-bar hinge, which is coupled in terms of motion to an actuating device 10 and to a locking device 11 (see FIG. 2). The actuating device 10 essentially contains an actuating lever 12 and a lever segment 13, while the locking device has two locking hooks 14, 15 arranged one behind the other in a longitudinal direction of the vehicle.

The rear opening lever 5 of the hinge unit 1, 2 is articulated to the actuating lever 12, which is in turn connected to the lever segment 13. The lever segment 13 is pivotable in a support point 4b of the bearing bracket 6 and is pivoted by an actuating cylinder 21, which is supported on the bearing bracket 6 and on the lever segment 13. During a movement of the folding-top compartment lid from the closed position into the open position, the lever segment 13 pivots in the direction of arrow 26 and, during a movement of the folding-top compartment lid from the open position into the closed position, it pivots counter to the direction of arrow 26. Both locking hooks 14 and 15 are connected to one another by a coupler rod 30, and a synchronous and superimposed motion of the two locking hooks 14 and 15 is therefore achieved.

In the case of the locking device of the folding-top compartment lid, a locking hook 15 situated at the rear—as seen in relation to the direction F of travel—can in each case be connected in the locking position II (FIGS. 1 and 2) to a locking pin 31 on the mounting support 3. The other locking hook 14, that situated at the front, can be connected in the locking position II to a locking pin 32 on the front opening lever 4. The common synchronous and superimposed motion of the two locking hooks 14, 15 is accomplished by the coupler rod 30.

The locking hook 15 situated at the rear has a control cam 33, which is in engagement with an integrated actuating element 34 on the lever segment 13 in the locking position II. In the unlocking position I, the locking hook 15 has been pivoted free and is arranged in a position out of engagement with the actuating element 34. In the locking position II, the control cam 33 of the locking hook 15 is arranged in a claw-type receptacle 35 of the actuating element 34 in the lever segment 13 and is held firmly grasped on each side by a nose-shaped feature 36 and 37. The other end of the locking hook 15 grips the locking pin 31 on the mounting support 3 by use of a longitudinal slot. In a corresponding way, the locking hook 14 situated at the front also grips the locking pin 32 on the front opening lever 4 by use of a longitudinal slot.

In the locking position II, the front nose-shaped feature 37 is raised as far as a recess 38 in a front guide surface of the control cam 33 and rests by a nose tip 39 in the recess 38. The other nose-shaped feature 36, that situated at the rear, is arranged in contact with a rear sliding surface of the control cam 33.

The rear nose-shaped feature 36 for the control cam 33 of the locking hook 15 has a nose tip 40 which points toward the rear sliding surface of the control cam 33 and, when the lever segment 13 is pivoted in the direction of arrow 26, is acted upon so as to turn in order to initiate the unlocking process, and, at the same time, the mounting support 3 is raised by the opening levers 4, 5, and the locking hook 15 can disengage from the locking pin 31 in the mounting support 3.

Figure 8:
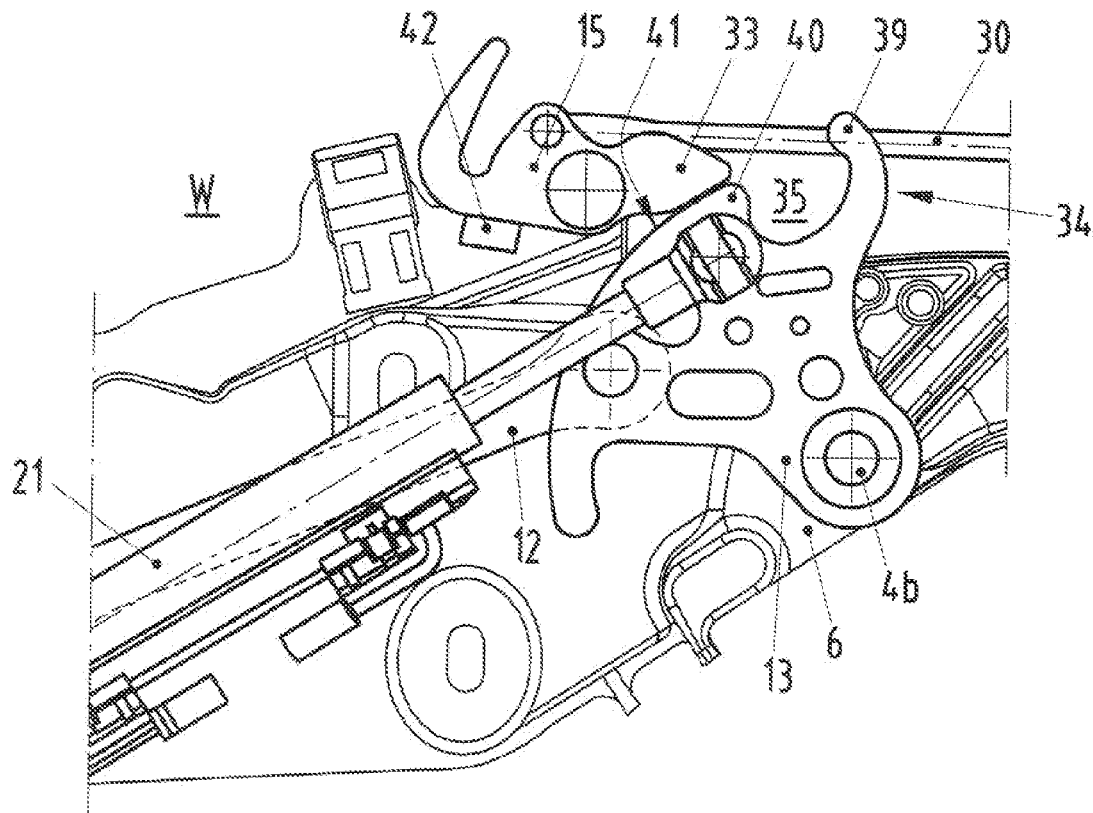
FIG. 8 is an enlarged representation of area W shown in FIG. 7 viewed in the direction of the locking hook with the actuating element in an intermediate position.
Figure 9:
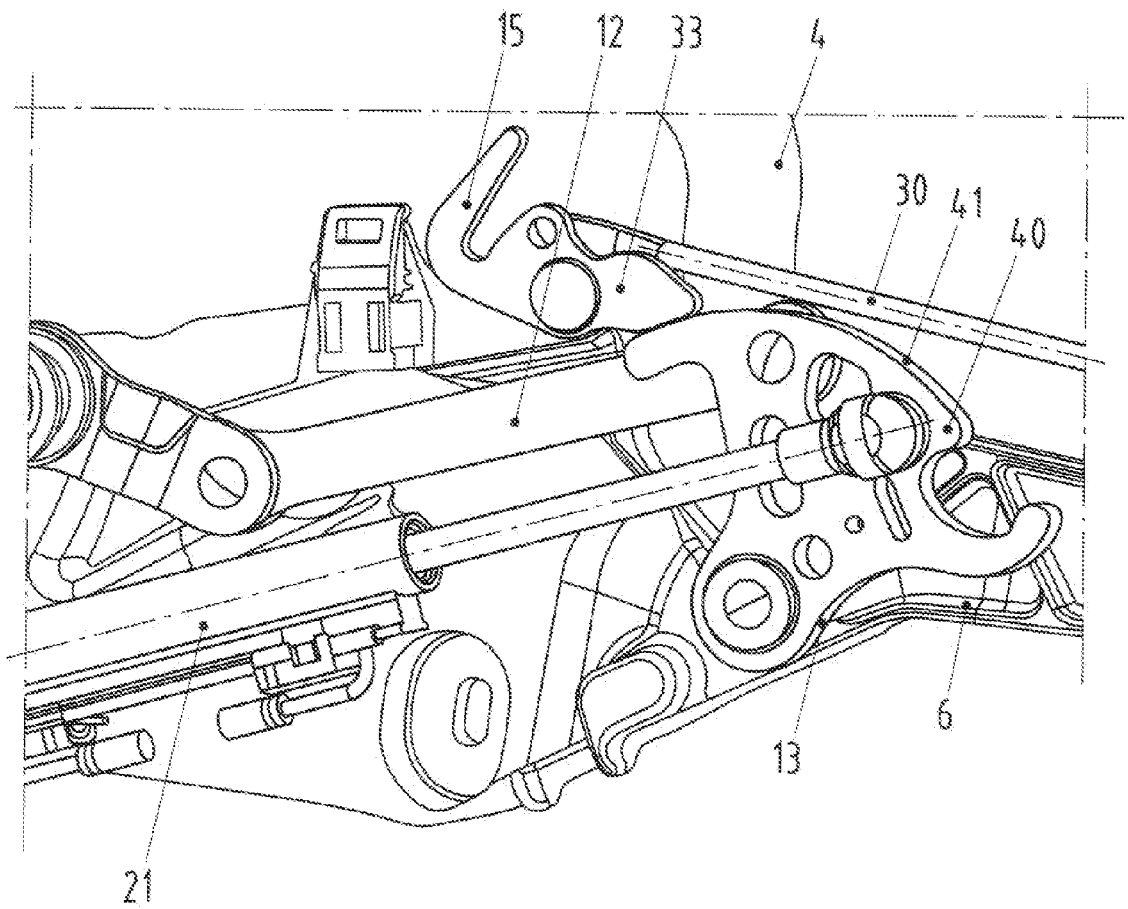
FIG. 9 is a side, perspective view of the locking hook in an end position, in which it has been pivoted so as to be completely free.

In the unlocking position I (FIGS. 7 and 8), the control cam 33 slides by its rear sliding surface on an arcuate surface 41 of the lever segment 13 adjoining the nose-shaped feature 36, and is supported on this surface 41. The locking hook 15 is prevented from turning further by a stop 42 on the bearing bracket 6. If appropriate, a leg spring may be used to support this function.

To return the locking hook 15 from the pivoted-free unlocking position I into the locking position II, in which it is pivoted into the lever segment 13, the lever segment 13 is pivoted counter to the direction of arrow 26 by the actuating cylinder 21, and the nose tip 39 of the nose-shaped feature 37 turns the locking hook 15 by acting upon the control cam 33, enabling the locking hook 15 to readopt the locking position II in accordance with FIGS. 1 and 2. During this process, the opening levers 4, 5, under the control of the actuating assembly, the lowered closed position S1 is simultaneously readopted.

As can be seen from FIGS. 1 to 9 in sequence, the unlocking and the locking process by way of the locking hooks 14, 15 is associated with the opening and closing motion of the folding-top compartment lid connected to the mounting support 3, and the locking hooks 14, 15 can thus be pivoted in a corresponding manner by way of the lever segment 13 which also activates the opening levers 4, 5.

To create an optimum wide basis of support a for the lever segment 13 and the front opening lever 4, the lever segment 13 and the front opening lever 4 are arranged on a common bearing pin L with an optimum wide transverse basis of support a, the lever segment being arranged on one side of the bearing bracket 6 and the front opening lever being arranged on the opposite side of the bearing bracket 6. The bearing pin L is securely connected (welded) to the opening lever 4 and is rotatably mounted in the bearing bracket 6.

Figure 10:
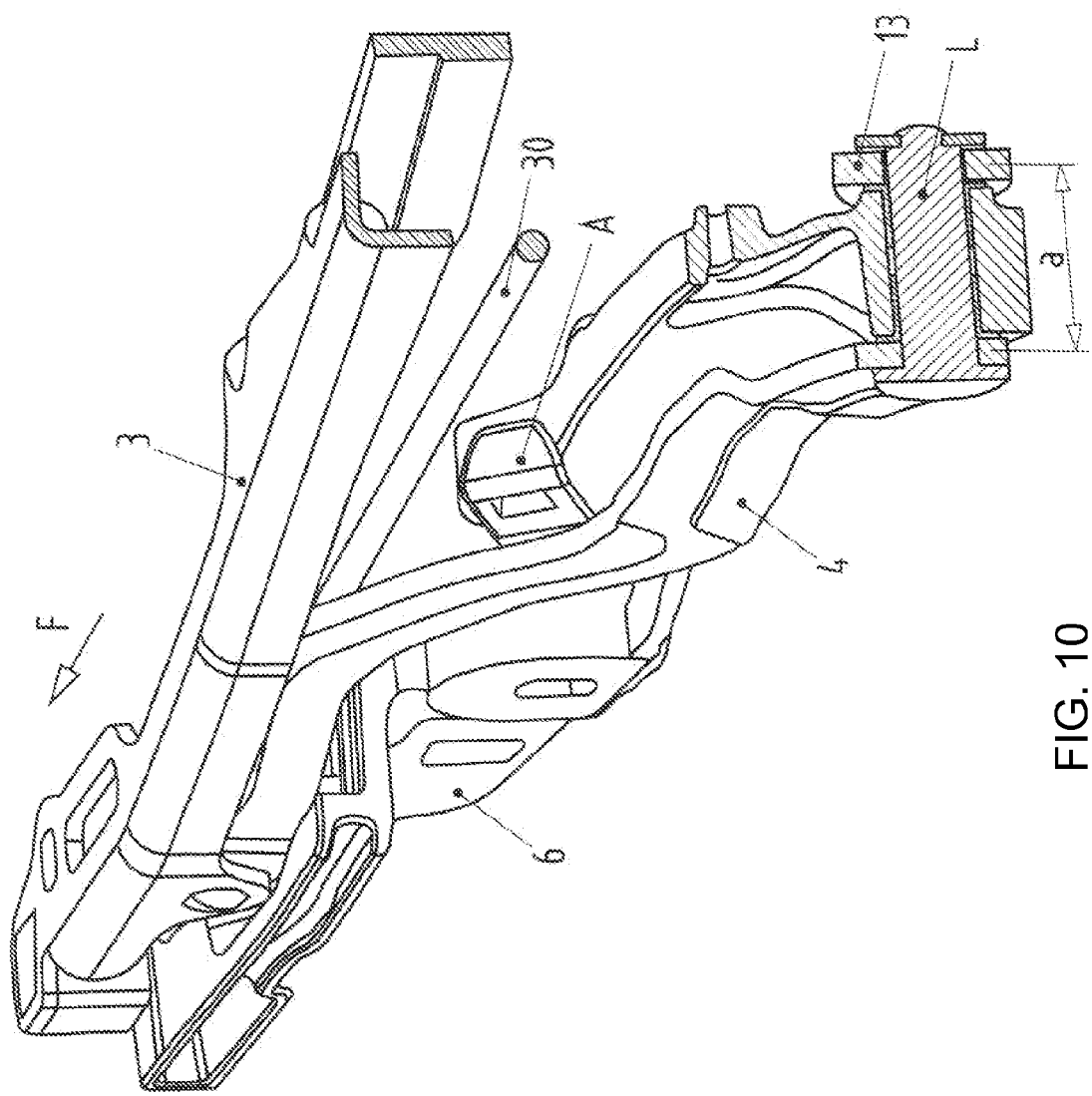
FIG. 10 is a diagrammatic perspective view of a common mounting for the lever segment and the front opening lever on both sides of a bearing bracket, on a bearing journal.

A stop A is furthermore provided for the bearing bracket 6 to fix the position of the front opening lever 4 in the y direction (transverse direction), and this stop can preferably be supported at the top of the bearing bracket 6 by an offset leg or the like when the opening lever 4 is in the lowered position in accordance with FIG. 10.

According to another advantageous embodiment of the invention, in accordance with FIGS. 11 to 14, both the lever segment 13 and the rear locking hook 15 are provided with a toothed section, preferably arcuate toothing 50, 51, which engage in one another in an operating position.

Figure 11:
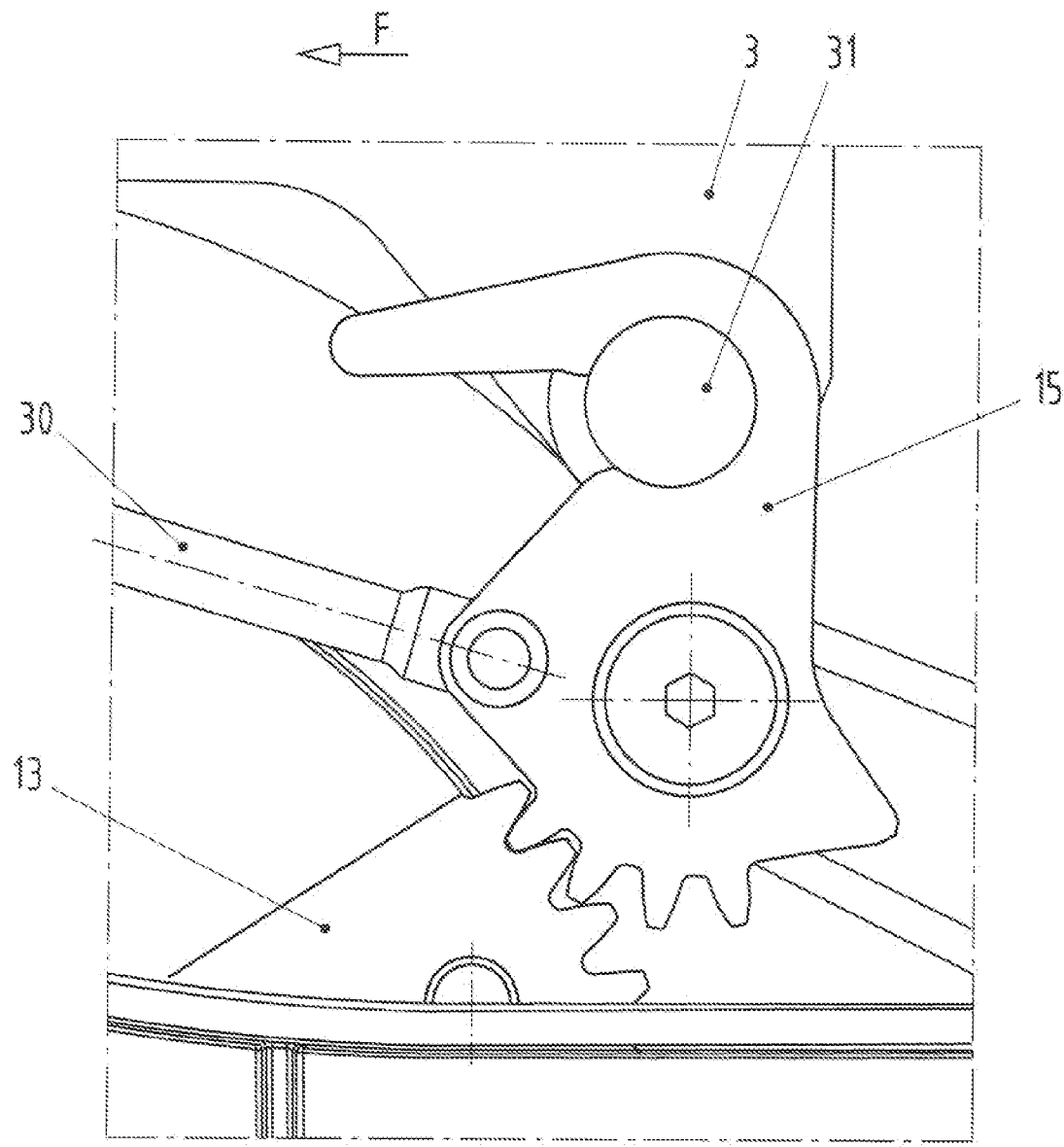
FIG. 11 is a side view of a further variant embodiment of the locking hook with the lever segment of the control assembly of the opening levers in a locking position, the hook and segment engaging in one another by way of arcuate toothed sections.
Figure 12:
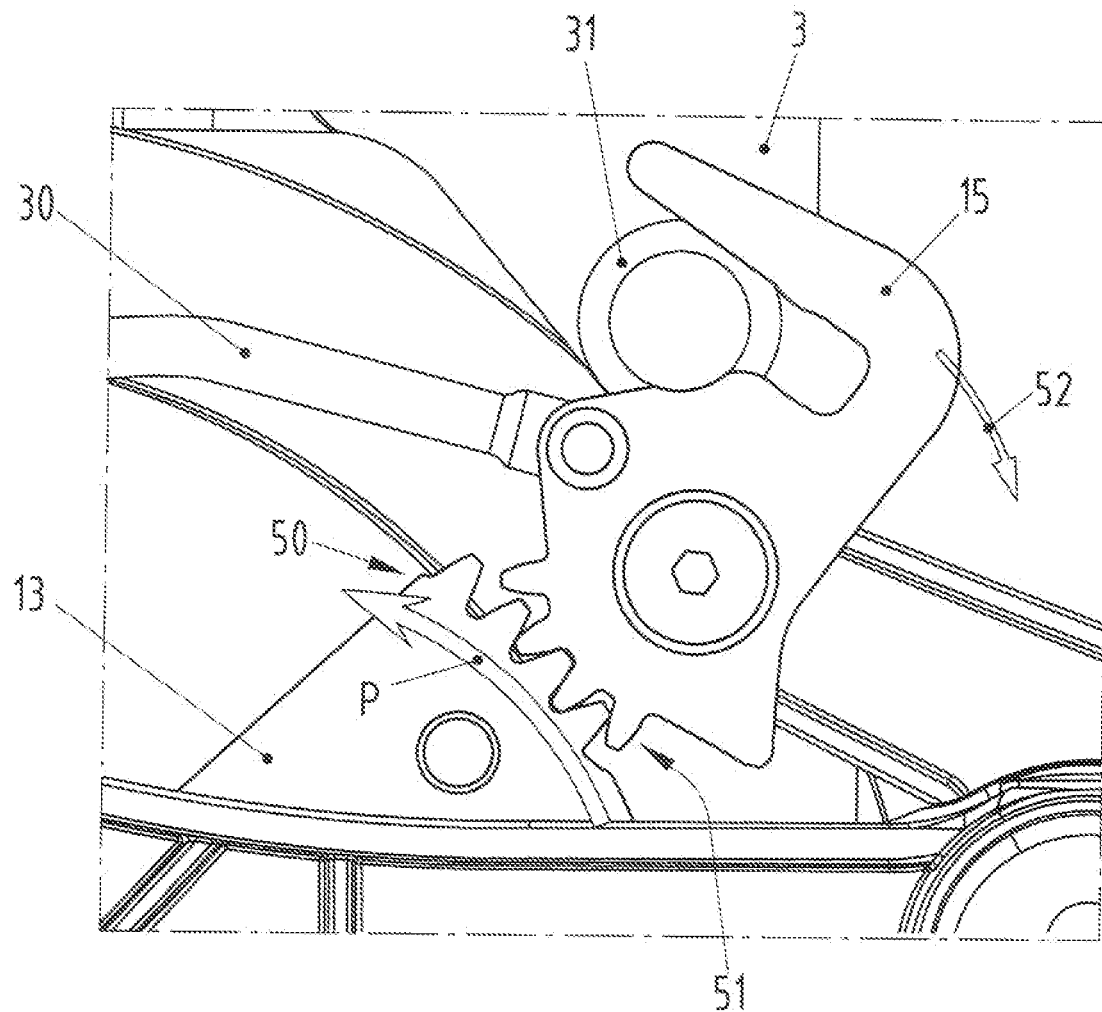
FIG. 12 is a side view representation of the locking hook at the beginning of an unlocking process.

As is shown in greater detail in FIGS. 11 and 12, both toothed sections 50 and 51 are in engagement with one another, and the locking hook 15 grips the locking pin 31 on the mounting support 3 in the locking position II, which corresponds to the closed position. When the lever segment 13 is pivoted by the actuating cylinder 21, the lever segment 13 pivots in the direction of arrow P, and the opening levers 4, 5 are pivoted synchronously in the direction of the unlocking position I, which corresponds to the open position, and the locking hook 15 moves in the direction of arrow 52 and already partially releases the locking pin 31.

Figure 13:
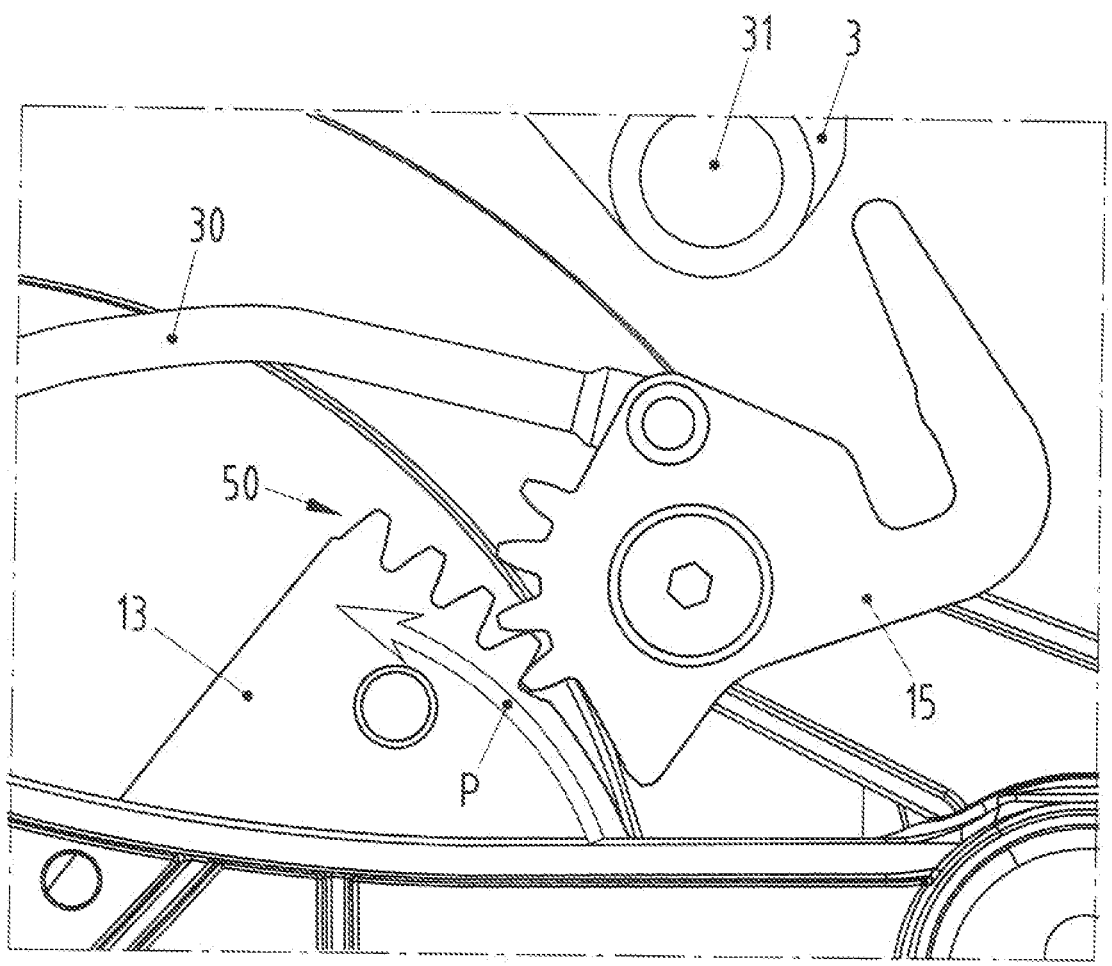
FIG. 13 is a side view representation of the locking hook in a pivoted-free position relative to the locking pin on the mounting support, in an intermediate position.
Figure 14:
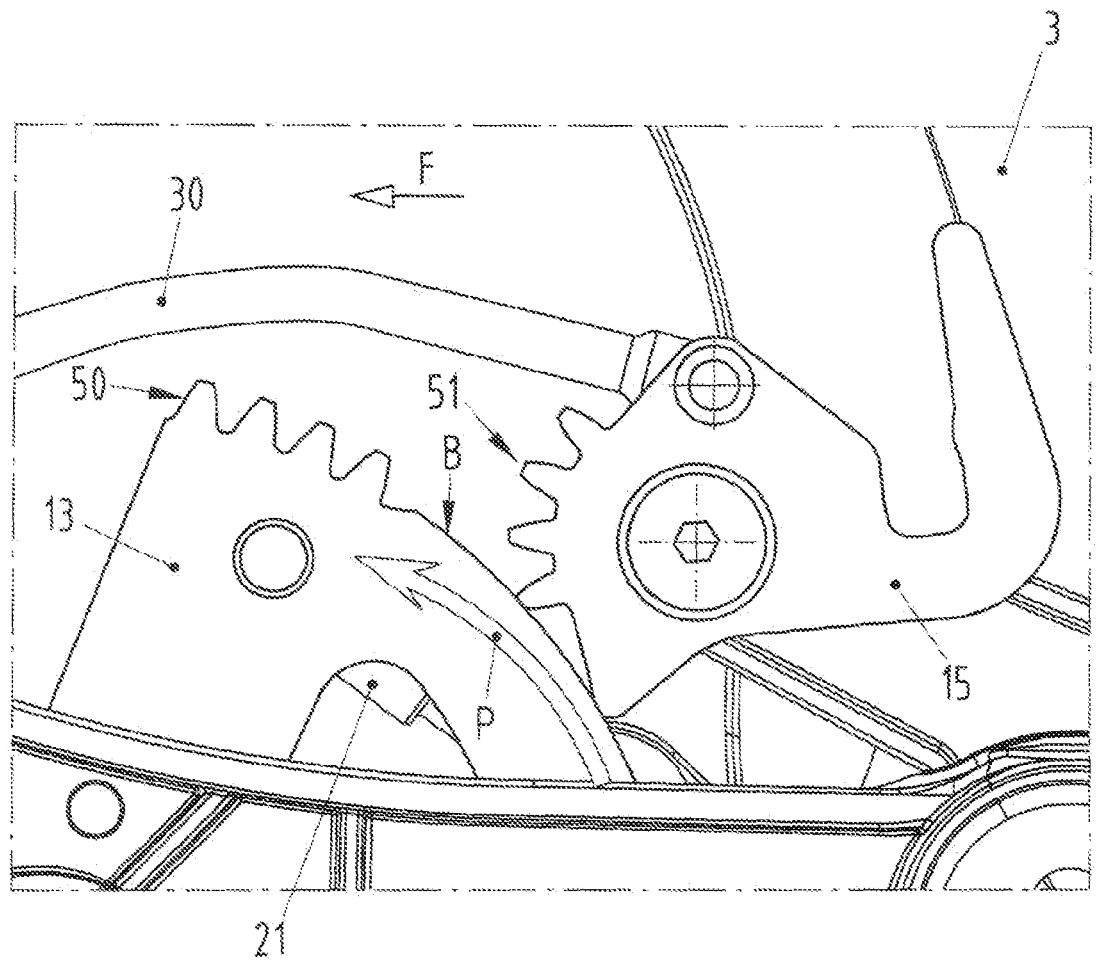
FIG. 14 is a side view representation of the locking hook in an end position with the folding-top compartment lid opened.

In FIG. 13, the locking pin 31 on the mounting support 3 has been released, while the toothed sections 50, 51 are still in engagement with one another with a few teeth. In FIG. 14, the two toothed sections 50, 51 are completely disengaged in the unlocking position I, and the locking hook 15 is supported on an arcuate surface B of the lever segment 13 and can no longer pivot, with the result that the locking hook 15 is held in a secured position.

The locking process takes place in a reverse sequence with the lever segment 13 being pivoted counter to the direction of arrow P and the locking hook 15 pivoting counter to the direction of arrow 52.

In both embodiments, lifting out of the closed position can be assisted and a downward overshoot during closure can be prevented through a defined extension of the rear locking hook 15 on the underside (not shown specifically).

The invention claimed is:

1. An apparatus for locking and unlocking a folding-top compartment lid for a rear folding-top compartment for holding a lowered folding top of a convertible, the folding-top compartment lid being movable between open and closed positions by four-bar hinges on each side of the rear folding-top compartment, the four-bar hinges being formed by front and rear opening levers, each of the front and rear opening levers having a lower articulated connection to a bearing bracket on a body of the convertible and an upper articulated connection to a mounting support for the folding-top compartment lid, the apparatus comprising: an activatable actuating device having a lever segment with an integrated actuating element; and a locking and unlocking device disposed between the bearing bracket and the folding-top compartment lid, said locking and unlocking device having a first pivotable locking hook engageable with said mounting support at a position rearward of the articulated connection of the front opening lever with the mounting support, a second pivotable locking hook engageable with the articulated connection of the front opening lever to the mounting support, and a coupler rod connecting said first and second locking hooks to one another to achieve synchronous movement therebetween, said first locking hook having a downwardly disposed control cam which, in a locking position, is in engagement with said integrated actuating element on said lever segment of said activatable actuating device and, in an unlocking position, is pivoted free and disposed out of engagement with said integrated actuating element.

2. The apparatus according to claim 1, wherein: said integrated actuating element has a claw-type receptacle and two nose-shaped features on opposite sides of the receptacle; and in the locking position, said first locking hook is disposed with said downwardly disposed control cam in said claw-type receptacle of said integrated actuating element in said lever segment, in a manner firmly grasped on each side by said two nose-shaped features, and said first locking hook having a longitudinal slot at an end remote from the downwardly disposed control cam, said longitudinal slot receiving a locking pin on the mounting support in a latching manner when the first locking hook is in the locking position.

3. The apparatus according to claim 2, wherein: said downwardly disposed control cam has a front guide surface with a recess formed therein and a rear sliding surface; and in the locking position, a first of the nose-shaped features of said activatable actuating element is substantially in said recess in said front guide surface in said downwardly disposed control cam, and a second of said nose-shaped features is disposed substantially in contact with said rear sliding surface of said downwardly disposed control cam.

4. The apparatus according to claim 3, wherein said second nose-shaped feature has a nose tip that points toward said rear sliding surface of said downwardly disposed control cam and is configured to turn said first locking hook toward the unlocking position when the lever segment is pivoted.

5. The apparatus according to claim 4, wherein: said lever segment has an arcuate surface adjoining said second nose-shaped feature; and in the unlocking position, said rear sliding surface of the downwardly disposed control cam is supported by on said arcuate surface of said lever segment adjoining said second nose-shaped feature, and is pivoted to be completely free of said claw-shaped receptacle of said activatable actuating element in said lever segment.

6. The apparatus according to claim 3, wherein said first nose-shaped feature of said lever segment fits over said first locking hook and engages said front guide surface of said downwardly disposed control cam of said first locking hook for acting upon the first locking hook to turn the first locking hook back from the pivoted-free unlocking position to the pivoted-in locking position.

7. The apparatus according to claim 1, wherein the front opening lever and said lever segment are supported pivotably on a common bearing pin, the front opening lever being arranged on one side of the bearing bracket and said lever segment being arranged on an opposite side of the bearing bracket.

8. The apparatus according to claim 1, wherein the front opening lever is supported in a vertical direction on the bearing bracket by an angular stop.

9. An apparatus for locking and unlocking a folding-top compartment lid for a rear folding-top compartment for holding a lowered folding top of a convertible, the folding-top compartment lid being movable between open and closed positions by a four-bar hinge on each side of the rear folding-top compartment, the four-bar hinge being formed by front and rear opening levers, each of the front and rear opening levers having a lower articulated connection to a bearing bracket on a body of the convertible and an upper articulated connection to a mounting support for the folding-top compartment lid, the apparatus comprising: an activatable actuating device having a corresponding arcuate toothed section; and a locking and unlocking device disposed between the bearing bracket and the folding-top compartment lid, said locking and unlocking device having a first pivotable locking hook engageable with the mounting support at a position rearward of the articulated connection of the front opening lever with the mounting support, a second pivotable locking hook engageable with the articulated connection of the front opening lever to the mounting support, and a coupler rod connecting said first and second hooks to one another to achieve synchronous movement therebetween, said first locking hook having an arcuate toothed section, which, in a locking position, is in engagement with said corresponding arcuate toothed section of said lever segment and, in an unlocking position, said toothed sections being out of engagement with one another, said arcuate toothed section of said first locking hook being supported and held secure on an arcuate path of said lever segment.

10. The apparatus according to claim 9, wherein said lever segment is in engagement with said arcuate toothed section of said first locking hook and pivots the first locking hook when said lever segment is pivoted into a position for adopting the locking position.

11. An apparatus for moving a folding-top compartment lid of a convertible between a closed locked position and an open unlocked position, comprising:
 front and rear opening levers each of which has a lower articulated connection to a bearing bracket on a body of the convertible and an upper articulated connection to a mounting support for the folding-top compartment lid;
 an actuating device mounted pivotably to the bearing bracket at the articulated connection between the front opening lever and the bearing bracket so that pivoting movement of the actuating device generates articulation of the opening levers for selectively opening or closing the folding-top compartment lid, the actuating device having a lever segment with an integrated actuating element;
 front and rear locking hooks pivotably mounted to the bearing bracket and engageable with front and rear positions on the mounting support;
 a coupler rod connecting the front and rear locking hooks to one another to achieve synchronous pivoting movement therebetween; and
 an engagement between the actuating device and one of the locking hooks so that pivoting movement of the actuating device pivots the locking hooks into or out of locked engagement with the mounting support.

12. The apparatus of claim 11, wherein the engagement between the actuating device and one of the locking hooks comprises engageable cam surfaces.

13. The apparatus of claim 11, wherein the engagement between the actuating device and one of the locking hooks comprises engageable teeth.

14. The apparatus of claim 11, wherein the front locking hook is engageable with the mounting support at the upper articulated connection of the front opening lever to the mounting support.

15. The apparatus of claim 11, wherein the actuating device is mounted pivotably to the bearing bracket at the lower articulated connection of the front opening lever to the bearing bracket.

* * * * *